E. R. Benton.
Bran Duster.
N° 9,881.  Patented Jul. 26, 1853.
Sheet 1-2 Sheets.

E. R. Benton.
Bran Duster.

N° 9,881. Patented Jul. 26, 1853.

UNITED STATES PATENT OFFICE.

EZRA R. BENTON, OF CLEVELAND, OHIO.

BRAN-DUSTER.

Specification of Letters Patent No. 9,881, dated July 26, 1853.

*To all whom it may concern:*

Figure 1:
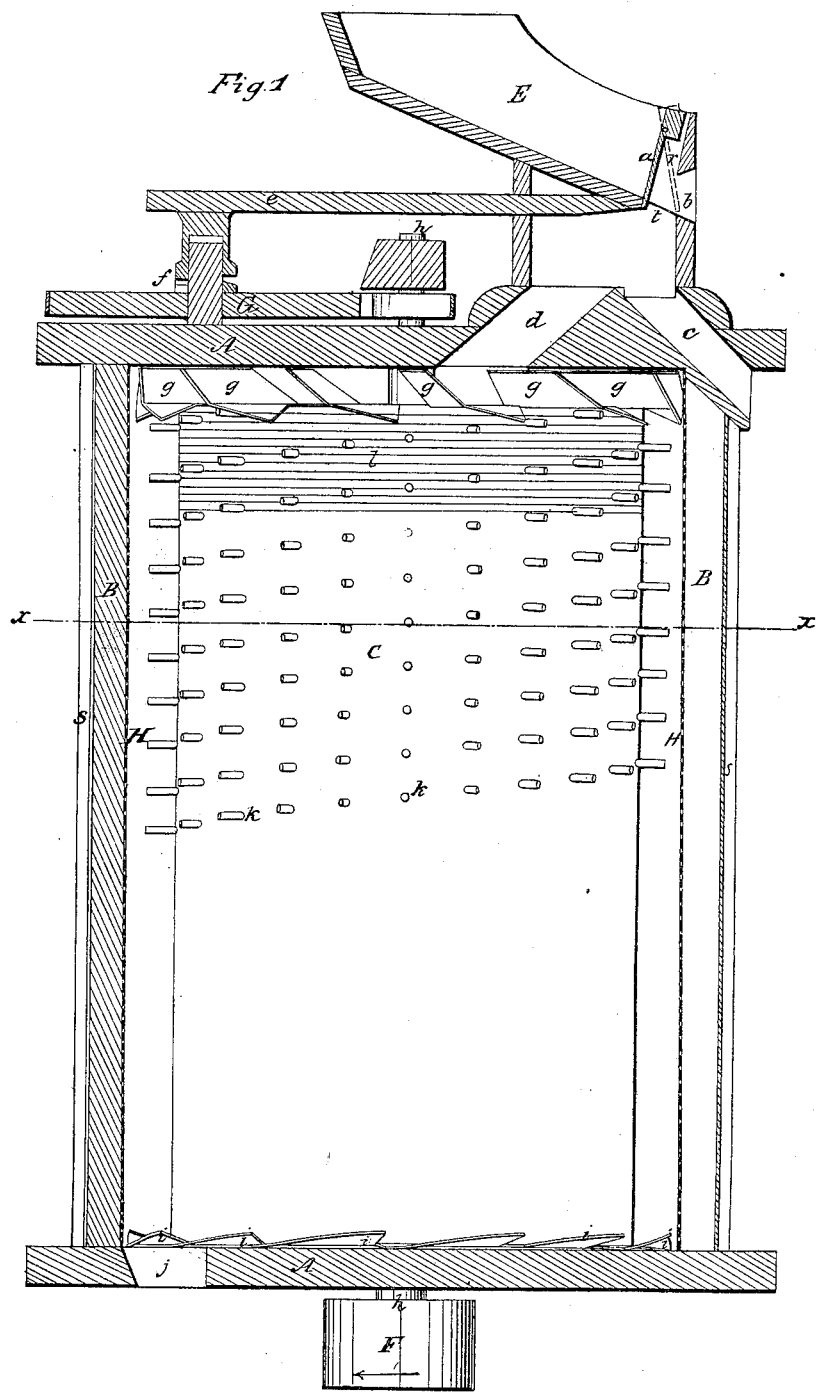
Figure 2:
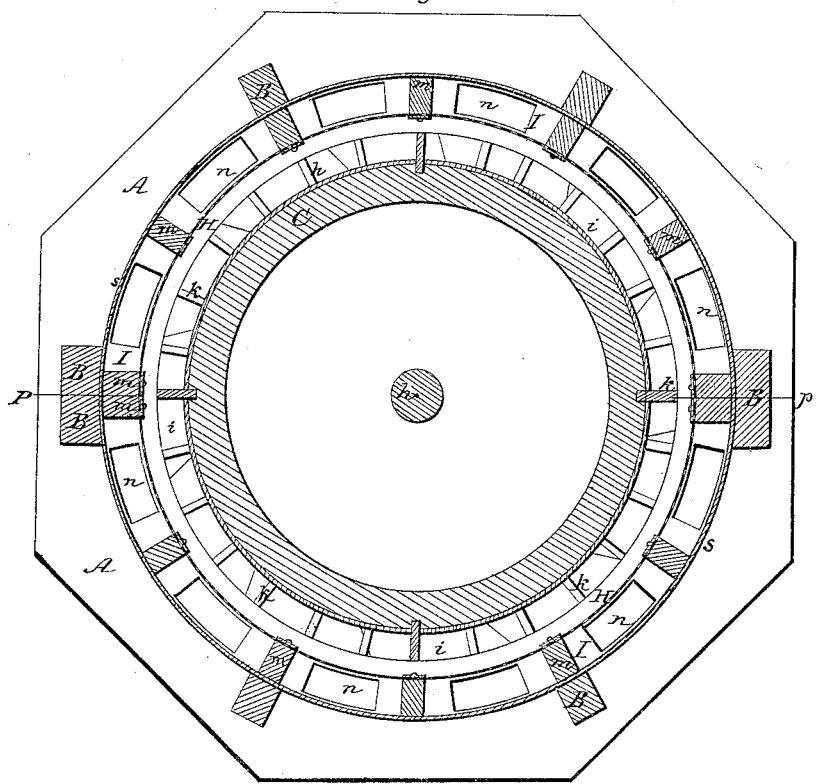
Figure 3:
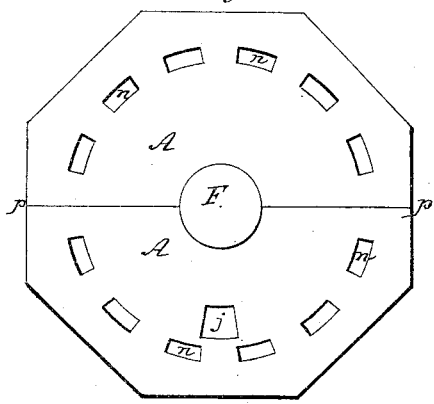

Be it known that I, EZRA R. BENTON, of Cleveland, in the county of Cuyahoga and State of Ohio, have invented a new and Improved Bran-Duster; and I do hereby declare that the following is a full and exact description thereof, reference being had to the accompanying drawings, making part of this specification, Figure 1 being an elevation of the cylinder and a vertical central section of the remainder of my improved bran-duster; Fig. 2, a horizontal section of the same in the line $x$ $x$ of Fig. 1; Fig. 3, plan of the lower end thereof, and Fig. 4 top view of the cylinder.

Like letters designate corresponding parts in all the figures.

The nature of my invention consists, first, in the arrangement of the feeding apparatus in such a manner that the bran is fed into the machine by an inward current of air, which, at the same time, permits all heavy substances to fall into a spout and be excluded; secondly, in the use of inwardly acting blasts, of different degrees of strength, at the top and bottom of the bran duster, their forces being proportioned in such a manner that the upper blast will feed the bran into the machine and drive the flour outward through the inclosing sieve, while the lower current only counteracts the downward pressure of the upper blast, so as to prevent any flour being discharged with the bran at the aperture in the bottom of the bran duster; and thirdly, in the arrangement of teeth, in lines ascending in the direction opposite to its motion, around the revolving cylinder, in such a manner that their action, by the revolution of the cylinder, tends to lift the bran, or, at least, to prevent its falling too rapidly to the bottom, substantially as hereinafter fully set forth.

Figure 4:
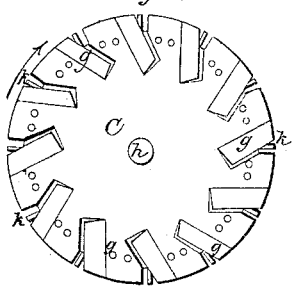

I usually construct my improved bran duster by means of two heads A, A, at the ends, connected by several ribs B, B, &c., arranged around the circumference of a circle, to the inner sides of which is attached a cylindrical metallic case $s$. Concentrically within this case, at a convenient distance therefrom, and the space between being separated into several compartments I, I, &c., by ribs $m$, $m$, &c., is inserted a cylindrical sieve H, whose meshes may be of equal fineness throughout, or portions opposite one or more of said compartments may be of different degrees of fineness, in order to produce different qualities of flour. A cylinder C, provided with teeth, or projections, $k$, $k$, &c., upon its surface, and driven by power applied to a pulley F, on the lower end of its shaft $h$, is made to revolve inside of the sieve H, leaving a considerable space between it and said sieve, for the teeth to revolve in, and to receive the bran to be acted on. A series of obliquely set wings, or fans, $g$, $g$, &c., is arranged upon the top of the cylinder, and over the space between it and the sieve H, in such a manner, (as shown in Figs. 1, and 4,) that, when the cylinder revolves in the direction indicated by the arrows, it causes a current of air, of the desired strength, to be drawn in through the apertures $d$, $b$, in the upper head of the machine, down into the space around the cylinder, whence it is distributed through the sieve into the compartments I, I, and finally out through the apertures $n$, $n$, &c., in the bottom of the bran duster. A similar series $i$, $i$, &c., is arranged upon the lower end of the cylinder, but only of sufficient power to neutralize the downward pressure of the upper draught, which becomes much weakened in its force by finding vent through an enlarged surface.

A hopper E, is situated on the top of the machine, so as to discharge its contents ordinarily into a spout $c$, which conveys them therefrom outside of the machine; but the apertures $b$, and $d$, through which the inward current of air passes, are arranged so that said current crosses the path of the substances falling into the spout $c$, and draws all the bran through the aperature $d$, into the duster, while any heavy substances, which may have been contained in the bran, and, if allowed to enter the bran duster, would have injured or clogged it, are allowed to fall into the spout $c$; so that a twofold purpose is thereby accomplished, viz, cleaning the bran from heavy impurities, and feeding it into the machine in a scattered state very suitable for being immediately acted on by the cylinder C. The hopper E, is agitated by means of a rotatory disk G, turned by a band passing from the shaft $h$, of the cylinder, which causes an arm $e$, reaching from said hopper to vibrate by means of cams $f$, on said disk and arm. The discharge of bran from the hopper is restrained and regulated by a flap, or board, $a$, oscillating on a pivot, and so balanced that its lower end very slightly presses against the lower end of the hopper, but not with sufficient force to prevent the bran's falling out gradually, when the hopper is shaken.

I also contemplate a modification of the feeding apparatus, by which I substitute an inclined wire screen *t*, of about ¼ inch mesh, for the spout *c*, over which heavy and bulky substances slide, while the bran is drawn through it. The manner of vibrating the hopper and screen *t*, may be varied as convenience may require.

The bran, when fed into the machine, is immediately beaten by the teeth *k, k*, &c., of the cylinder, whereby the fine dust, or flour, which adheres to it, is separated therefrom, and carried by the centrifugal draft of air through the meshes of the sieve H, into the compartments I, I, &c., and is thence discharged through the apertures *n, n*, &c., in the bottom of the duster.

The teeth *k, k*, &c., are arranged spirally around the cylinder; or in such a manner that each tooth next in order around the periphery, in the opposite direction to the motion, of the cylinder, is placed at a uniform distance higher up than the one preceding, as shown by the graduated lines at *l*, Fig. 1; so that the upward action, produced by this ascending succession of teeth, prevents the bran from descending too rapidly to enable it to be properly beaten by said teeth. The slight upward current of air produced by the lower fans *i, i*, &c., does not prevent the bran's being discharged through the aperture *j*, in the bottom of the machine; and it only raises any flour, which may have settled to the bottom with the bran, enough to be acted on by the centrifugal draft through the sieve and thus be saved.

In a bran duster patented by Frost and Monroe—Feb. 27th 1849—I am aware that a fan with oblique wings is employed at the top of the machine—for producing a draft of air into the same—and a fan, with wings parallel with the axis of the cylinder, is employed at the bottom of the machine, for the purpose of sweeping the bran from the bottom of the machine into a lateral opening in the side of the same. The difference between the description and arrangement of fans in the Frost and Monroe bran duster, and those employed in my bran duster, consists in the character and operation of the fan employed at the bottom of the machine. In the Frost and Monroe bran duster, the faces of the wings of the fan at the bottom of the machine being parallel with their axis of motion, produce no upward current of air to retard the descent of the flour or bran in the machine; whereas, in my bran duster, the wings of the fan at the bottom of the machine, being arranged obliquely to the axis of the cylinder, produce an upward current of air of just sufficient force to so far counteract the downward current of air produced by the fan at the top of the machine, as to prevent the descent of any of the flour to the bottom of the machine, while it allows the bran to gradually descend and fall through the said series of lower oblique wings, and be discharged at the aperture *j*, in the bottom of the machine, as herein before set forth.

I am aware that in a bran duster, patented Feb. 27th 1849, a fan with oblique wings is employed at the top of the machine, for producing a draft of air into the same, and a fan with wings parallel with the axis of the cylinder, is employed at the bottom of the machine, for sweeping the bran from the bottom of the machine into a lateral opening in the side of the same; and therefore, I wish it to be understood that I do not claim the said arrangement and character of fans in a bran duster, as my invention: but What I do claim and desire to secure by Letters Patent is, The combination of the two inwardly acting drafts of air, of different degrees of strength, produced by the oblique fans *g, g*, &c., and *i, i*, &c., when their forces are proportioned in such a manner that the upper blast will feed the bran into the machine and drive the flour through the sieve H, while the lower current only counteracts the downward pressure of the upper blast so as to prevent any flour from falling to, and being discharged with the bran at the aperture *j*, in, the bottom of the duster, substantially as described.

The above specification of my new and improved bran-duster signed by me this 26th day of November 1852.

E. R. BENTON.

Witnesses:
E. HESSENNWELLE,
E. H. NEWCOMB.